(12) United States Patent
Jung et al.

(10) Patent No.: US 8,115,339 B2
(45) Date of Patent: Feb. 14, 2012

(54) ISOLATION CONTROL HIGH SPEED TRANSFER SWITCH FOR UNINTERRUPTIBLE POWER SUPPLY, POWER SUPPLY SYSTEM USING THE SWITCH AND ISOLATION CONTROL HIGH SPEED TRANSFER SWITCHING METHOD

(75) Inventors: Hyun Chul Jung, Seoul (KR); Byoung Sam Kim, Goyang-si (KR)

(73) Assignee: KT Corporation, Sungnam-si (KR)

( * ) Notice: Subject to any disclaimer, the term of this patent is extended or adjusted under 35 U.S.C. 154(b) by 187 days.

(21) Appl. No.: 12/392,014

(22) Filed: Feb. 24, 2009

(65) Prior Publication Data
US 2009/0322152 A1    Dec. 31, 2009

Related U.S. Application Data

(63) Continuation of application No. PCT/KR2006/003825, filed on Sep. 26, 2006.

(30) Foreign Application Priority Data

Aug. 24, 2006  (KR) .................. 10-2006-0080426

(51) Int. Cl.
  *H02J 7/00*      (2006.01)
  *H02J 9/00*      (2006.01)
(52) U.S. Cl. .......................................... 307/66; 307/64
(58) Field of Classification Search ................. None
  See application file for complete search history.

(56) References Cited

U.S. PATENT DOCUMENTS

| | | | | |
|---|---|---|---|---|
| 3,714,452 A | * | 1/1973 | Williamson | 307/86 |
| 4,763,014 A | * | 8/1988 | Model et al. | 307/66 |
| 5,142,163 A | * | 8/1992 | Hase | 307/64 |
| 5,237,208 A | * | 8/1993 | Tominaga et al. | 307/66 |
| 5,642,002 A | * | 6/1997 | Mekanik et al. | 307/64 |
| 6,445,086 B1 | * | 9/2002 | Houston | 307/24 |
| 6,597,075 B1 | * | 7/2003 | Goodrich, II | 307/66 |
| 6,795,322 B2 | * | 9/2004 | Aihara et al. | 307/64 |

(Continued)

FOREIGN PATENT DOCUMENTS

| | | |
|---|---|---|
| JP | 04-150740 A | 5/1992 |
| JP | 08-205423 A | 8/1996 |
| JP | 2001-069689 A | 3/2001 |
| KR | 10-2000-0040412 A | 7/2000 |

OTHER PUBLICATIONS

JP Patent 08-205423 to Inukai et al.—english machine translation, Aug. 9, 1996.*

(Continued)

*Primary Examiner* — Rexford Barnie
*Assistant Examiner* — Justen Fauth
(74) *Attorney, Agent, or Firm* — Knobbe Martens Olson & Bear LLP

(57) ABSTRACT

Disclosed is a UPS isolation control high speed transfer switch for switching a power supply path of a UPS to a bypass line and a power supply system equipped with the high speed transfer switch. The switch is isolated from the UPS and detects the output power of UPS, and switches a power supply path from a normal power line to the bypass line, by turning off the transfer switch of the bypass line after turning off an output breaker of a normal power line when the output power is deviated from a preset normal range. Furthermore, the switch performs a switching to the bypass line only when the output breaker of the UPS is actually turned off, after confirming the turn-off of the output breaker when switching the power supply path to the bypass line.

13 Claims, 7 Drawing Sheets

U.S. PATENT DOCUMENTS

| | | | |
|---|---|---|---|
| 6,917,125 B2* | 7/2005 | Yim | 307/66 |
| 2002/0011752 A1* | 1/2002 | Powell et al. | 307/64 |
| 2002/0109410 A1* | 8/2002 | Young et al. | 307/64 |
| 2004/0036361 A1* | 2/2004 | Dai et al. | 307/64 |
| 2004/0150371 A1* | 8/2004 | Mount et al. | 320/137 |
| 2004/0189094 A1* | 9/2004 | Hori | 307/29 |
| 2006/0226706 A1* | 10/2006 | Edelen et al. | 307/64 |

OTHER PUBLICATIONS

International Search Report dated May 23, 2007 of corresponding PCT Application No. PCT/KR2006/003825—3 pages.

Written Opinion dated May 23, 2007 of corresponding PCT Application No. PCT/KR2006/003825—5 pages.

* cited by examiner (a)

(b)

(c)

(a)

(b)

(c)

ISOLATION CONTROL HIGH SPEED TRANSFER SWITCH FOR UNINTERRUPTIBLE POWER SUPPLY, POWER SUPPLY SYSTEM USING THE SWITCH AND ISOLATION CONTROL HIGH SPEED TRANSFER SWITCHING METHOD

CROSS-REFERENCE TO RELATED APPLICATION

This application is a continuation application under 35 U.S.C. §365(c) of International Application No. PCT/KR2006/003825, filed Sep. 26, 2006 designating the United States. International Application No. PCT/KR2006/003825 was published in English as WO2008/023861 A1 on Feb. 28, 2008. This application further claims the benefit of the earlier filing date under 35 U.S.C. §365(b) of Korean Patent Application No. 10-2006-0080426 filed Aug. 24, 2006. This application incorporates herein by reference the International Application No. PCT/KR2006/003825 including the International Publication No. WO2008/023861 A1 and the Korean Patent Application No. 10-2006-0080426 in their entirety.

BACKGROUND

1. Field

The present disclosure relates to an uninterruptible power supply (UPS), more particularly, to an isolation control high speed transfer switch for UPS and a power supply system using the same, while independently operating with UPS, which is capable of more stably switching a power supply path from a normal power line to a bypass line without a hit (momentary power failure), even when there is a possibility of generating the hit since the power supplying function through the normal power line is impossible due to the malfunction of the UPS and the control function is also impossible.

2. Discussion on the Related Technology

In most cases, UPS is designed to supply a stable power to a load by outputting a uniform voltage and frequency even when the common power source has a power failure without a notice or an input power is non-uniform, FIG. 1 is a configuration diagram showing the configuration of an uninterruptible power supply (UPS) of the related art. In a normal mode, in case an alternating current AC power is inputted to UPS through a transfer switch CB1, the inputted alternating current AC power is transformed into a direct current DC power in a rectifier 1. The transformed direct current DC power is supplied to an inverter 2 and, at the same time, the battery 3 is charged. The inverter 2 transforms again the output power of the rectifier 1 into the alternating current to provide to a load. At this time, the state of an output breaker CB3 becomes turn-on, while the state of a transfer switch STS, CB4 of a bypass module 4 becomes turn-off. In case the input power is blocked-off due to an electricity failure, DC power that is charged in the battery 3 is transformed into AC power to supply to a load. Here, a path where the input power or DC power of the battery 3 is supplied through the inverter 2 is called as normal power line.

However, when the malfunction of the inside of UPS or the exterior momentary short-accident is generated in the state where the input power is normally inputted, the electric power through the normal power line, sometimes, can not be supplied. In this case, the control means (not shown) of UPS blocks off the normal power line by turning off the output breaker CB3, and switches the power supply path from the normal power line to the bypass line by turning on the transfer switch STS, CB4 of the bypass module 4. Thus, the input power is immediately supplied to the load through the bypass line. At this time, ON signal is applied to the transfer switch CB4 of the bypass module 4 and, simultaneously, to the static transfer switch STS, thereafter, the transfer switch CB4 is turned on, immediately after the static transfer switch STS is turned on.

Hereinafter, methods used in UPS of the related art for switching to the bypass line will be described. First, while the fuse which is located in output terminal of the inverter 2 is melted and cut, UPS blocks off the electric power which is supplied through UPS. Then, UPS detects the melting signal, and switches the power output line to the bypass line, Second, in the drain of the inverter 2, UPS detects whether the output power becomes "0" or not, and blocks off the gate of Insulated Gate Bipolar Transistor (IGBT) which is a power conversion device of the inverter, and, at the same time, switches the power supply path to the bypass line.

Third, UPS detects the output signal of the fuse which is located in the output terminal of inverter, and switches the power supply path to the bypass line according to the signal. Fourth, none of the above-described three methods is used, or the second and the third method can be mingled to be used.

In the meantime, in most cases, the 98% among the reason of the power failure generated in the communications industrial site is resulted from the malfunction of the inside of UPS, while the 82% among them is caused by the short circuit of a rectifier and an inverter power conversion device and by the damage of transistor due to a fire. In case a bulk current is flowed into the inside due to the malfunction of the inside of UPS, the damage by a fire is generated in the whole control device, with a burning. Furthermore, in case the switching to the bypass line is delayed, the output breaker of UPS is damaged by a fire due to an overheat such that the malfunction may be generated and a big accident may be caused.

Therefore, in case of the above-described first method, when the function of the controller (not shown) is deprived due to the transient situation in which the fuse is melted, frequently, the switching is not normally performed. Additionally, the power conversion device has the problem that the operation is not performed in the open state which is not short-accident state, that is, the output stop state.

In case of the second method, it should pass through the process of trouble detection→IGBT gate block off→output stop→output power detection→transmitting to CPU→malfunction determination→by-pass command→switching. In this case, no matter what fast device is used, the switching time is detected over 208~290 ms by the actual measurement. This exceeds 4 ms which is the basic specification of UPS, then, the state of the load already becomes the stationary state. Further, in case the function of a controller is deprived like the first method, it can be an uncontrollable state.

In case of third and fourth method, the switching time can be extended over 8~24 ms like the second method. Furthermore, in case of losing the control function, the operator has to supply power mechanically. Therefore, the switching time is required over 190~600 ms such that it can utterly be the stationary state.

Furthermore, in the interlock machine having a structure where the transfer switch CB4 is turned on when the output breaker CB3 is blocked while the mechanical transfer switch and the output breaker CB3 of the bypass module 4 (not shown) are formed as the interlock device, in case the failure of UPS control function happens, as shown in (c) of FIG. 2, the switching time can be required over 670~690 ms.

FIG. 2 shows graphs showing the change of the state of UPS output power in case the malfunction of UPS with the malfunction of the control is generated when UPS is operated according to the related second and the third method.

Furthermore, as to the switching of the power supply path, in case the power supply path is switched to the bypass line, the output breaker CB3 has to be turned off That is, the control means (not shown) of UPS 10 outputs OFF signal for the output breaker CB3 before turning on the transfer switch STS, CB4 of the bypass module. On the other hand, the signal of OFF for the output breaker CB3 was normally outputted, however, the output breaker CB3, actually, may not be normally turned off For example, in case the contact point of the output breaker CB3 is melted and sticked, the output breaker CB3 is not normally turned off even in case the OFF signal is generated. In this case, the output power of UPS as well as the power through the bypass line is supplied together to the load to cause a bigger trouble.

However, the UPS immediately turns on the static transfer switch STS while not confirming the normal condition of the output breaker CB3, it has the problem of generating other troubles.

The foregoing discussion in the background section is to provide general background information, and does not constitute an admission of prior art.

SUMMARY

An aspect of the present invention is to perform switching the power supply path quickly and steadily by improving the structure of the switching unit for the uninterrupted power supply, even in the situation where UPS is unable to normally operate.

According to an aspect of the present invention, provided is an isolation control high speed transfer switch for switching a power supply path of an UPS (Uninterruptible Power Supply) to a bypass line, wherein the isolation control high speed transfer switch is isolated from the UPS and detects the output power of UPS, and switches the power supply path from a normal power line to the bypass line when the output power is deviated from a preset normal range.

An UPS isolation control high speed transfer switch according to another aspect of the present invention comprises an output state detection unit that detects the output power of an UPS; a power quality determining unit that compares the output power of the output state detection unit with a reference voltage, and selectively activates an abnormality generation signal according to the comparison result; and a switching command unit that activates a first switching signal for turning off an output breaker of the UPS, and activates a second switching signal for turning on the transfer switch of a bypass line only when the output breaker of the UPS is actually turned off, after confirming the turn-off of the output breaker.

A power supply system according to further aspect of the present invention comprises: a UPS that supplies an input power or a battery power of the inside to a load through a normal power line in a normal mode, and switches a power supply path from the normal power line to a bypass line according to a switching signal applied from the outside in an abnormal mode; and an isolation control high speed transfer switch that detects the output power of the UPS, and activates the switching signal when the output power is deviated from a preset normal range.

A method of UPS isolation control high speed switching according to still further aspect of the present invention comprises a first step of activating an abnormality generation signal when the output power of a UPS is deviated from a preset normal range; a second step of activating a first switching signal for turning off an output breaker of the UPS; a third step of confirming the turn-off of the output breaker according to the first switching signal; and a fourth step of activating a second switching signal for turning on the transfer switch of a bypass line of the UPS when the output breaker is turned off.

DETAILED DESCRIPTION OF EMBODIMENTS

Figure 3:
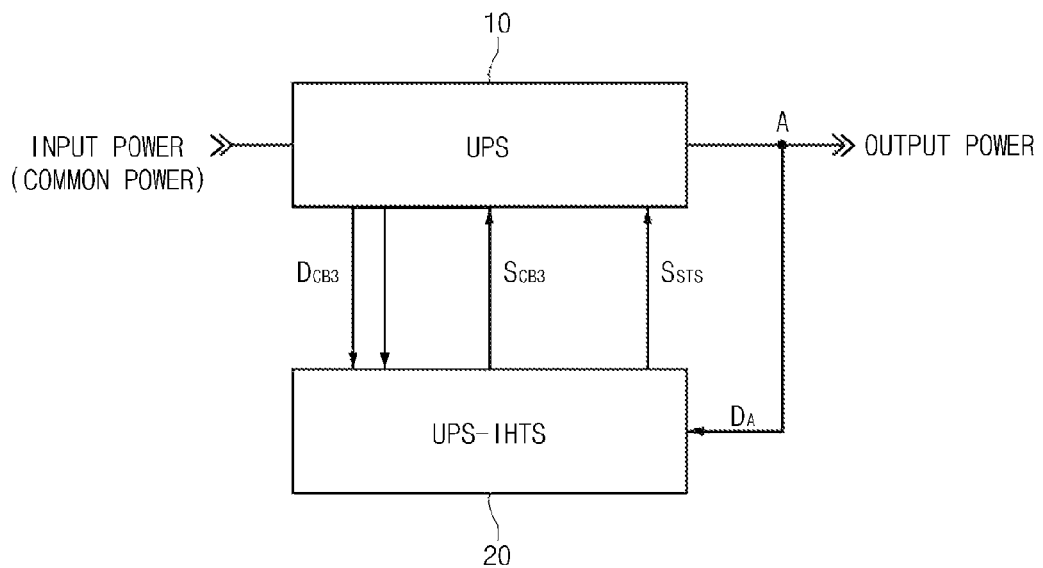
FIG. 3 is a configuration diagram showing the configuration of a power supply system according to one embodiment of the present invention.

Embodiments will be described in detail. FIG. 3 is a configuration diagram showing the configuration of a power supply system according to one embodiment of the present invention.

Figure 1:
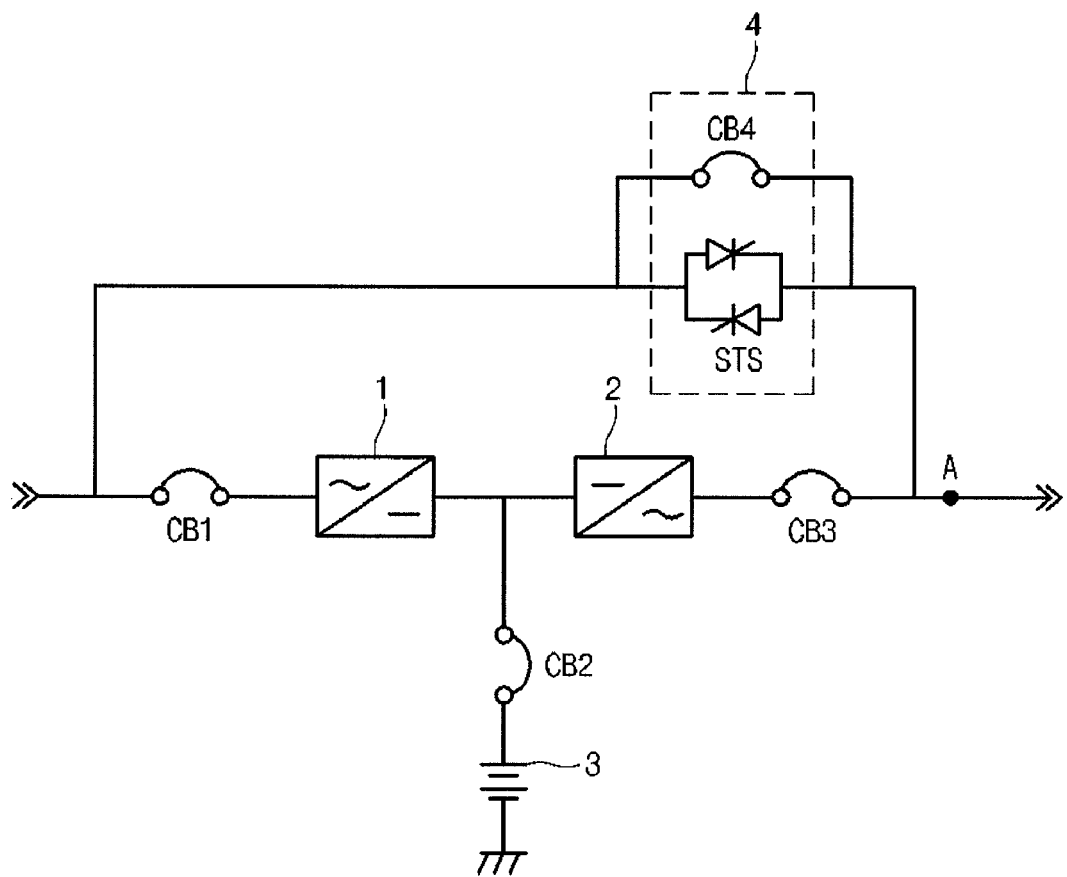
FIG. 1 is a configuration diagram showing the configuration of an uninterruptible power supply (UPS) of the related art.
Figure 2:
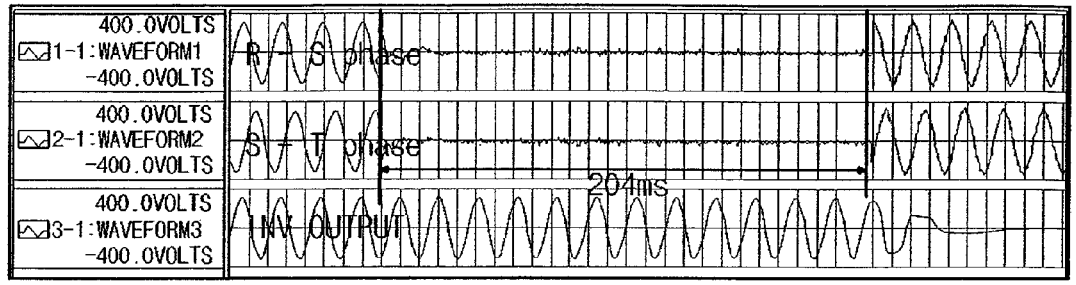
FIG. 2 shows graphs showing the change of the state of UPS output power in switching to a bypass line according to the control method of the related art.
Figure 2:
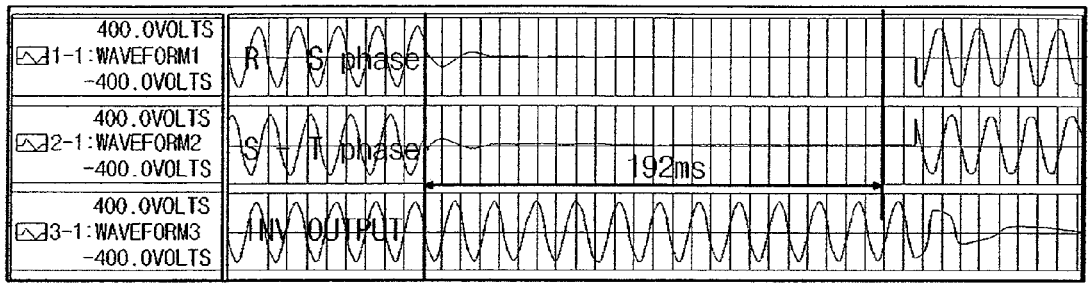
Figure 2:
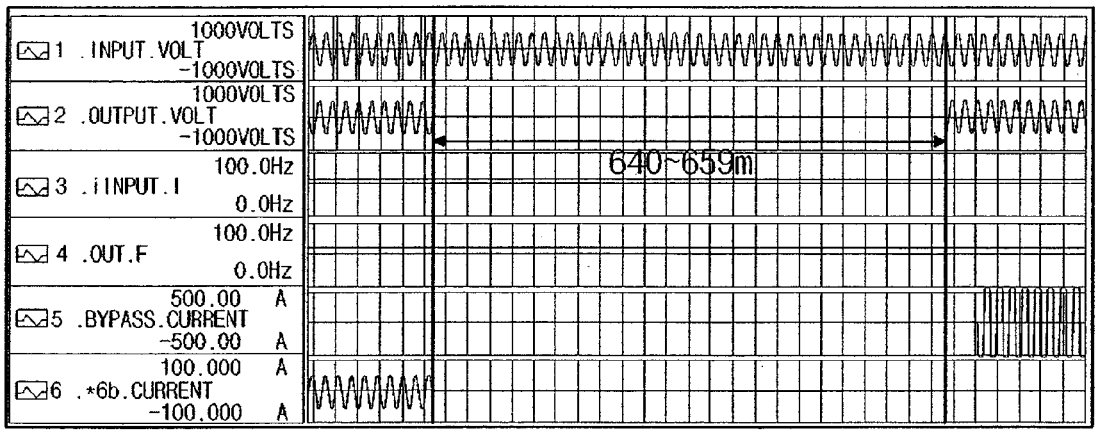

The power supply unit according to one embodiment of the present invention provides UPS 10 and an isolation control high speed transfer switching unit UPS-IHTS 20. UPS 10 supplies the input power of alternating current to the load through the normal power line in the normal mode, and supplies the power which has been charged in the battery of the inside to the load in case a failure is generated in the input power source in order that the hit is not generated when the electric power is supplied to the load. Further, in the abnormal mode, UPS 10 switches the power supply path from the normal power line to the bypass line according to the switching signal $S_{CB3}$, $S_{STS}$ applied from the isolation control high speed transfer switch 20 and, thereby, the hit is not generated in supplying the power to the load. That is, UPS 10 does not have the transfer switching unit for controlling the switching to the bypass line in the inside of UPS 10. The switching of the power supply line is controlled by the additional high speed transfer switch 20 which is isolated from UPS 10 as shown in FIG. 3. That is, in case UPS 10 has the configuration like FIG. 1, the ON/OFF of the output breaker CB3 and the ON/OFF operation of transfer switch STS and CB4 of the bypass module 4 are controlled by the isolation control high speed transfer switch 20 which is not control means (not shown) of the inside of UPS 10. Hereinafter, in the embodiment, UPS 10 has the configuration of FIG. 1 for convenience.

In case the output power of UPS 10 deviates from a preset normal range, for example, 380V±38V, 60 Hz±3 Hz, the isolation control high speed transfer switch 20 controls the ON/OFF of the output breaker CB3 and the transfer switch STS, CB4 of the bypass module 4, thereby, switching the supply path of the input power from the normal power line to the bypass line. That is, the isolation control high speed transfer switch 20 detects the state of the power $D_A$ of the final output terminal A spot of UPS 10, and detects whether the detected value is deviated from the normal range or not. As a result of the detection, in case the output power $D_A$ deviates from the normal range, the isolation control high speed transfer switch 20 generates the switching signal $S_{CB3}$ to turn off the output breaker CB3, and generates the switching signal $S_{STS}$ to turn on the static transfer switch STS. Now that the transfer switch CB4 is set up to be automatically turned on immediately after the static transfer switch STS is turned on in the bypass module 4, hereinafter, it will be illustrated just only for the static transfer switch STS. At this time, the isolation control high speed transfer switch 20 confirms whether the output breaker CB3 is normally turned off, before generating the switching signal $S_{STS}$. That is, the isolation control high speed transfer switch 20 does not immediately generate the switching signal $S_{STS}$ after the generation of switching signal $S_{CB3}$, and confirms the ON/OFF state $D_{CB3}$ of the output breaker CB3. As a result of the confirmation, the isolation control high speed transfer switch 20 generates the switching signal $S_{STS}$ only when the output breaker CB3 is normally turned off. Particularly, in one embodiment of the present invention, the isolation control high speed transfer switch 20 is separated from UPS 10 with a different configuration, as shown in FIG. 3, and independently controls the switching of the output power of UPS 10. Therefore, the switching of the output power of UPS 10 is normally performed by the isolation control high speed transfer switch 20 even when UPS 10 control means (not shown) does not normally operate.

Figure 4:
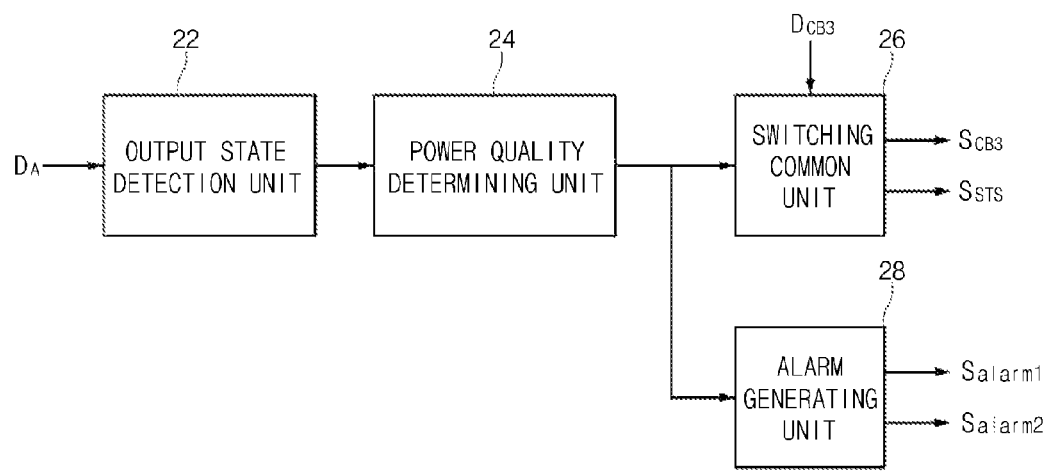
FIG. 4 is a configuration diagram showing the configuration of an isolation control high speed transfer switch in FIG. 3.
Figure 5:
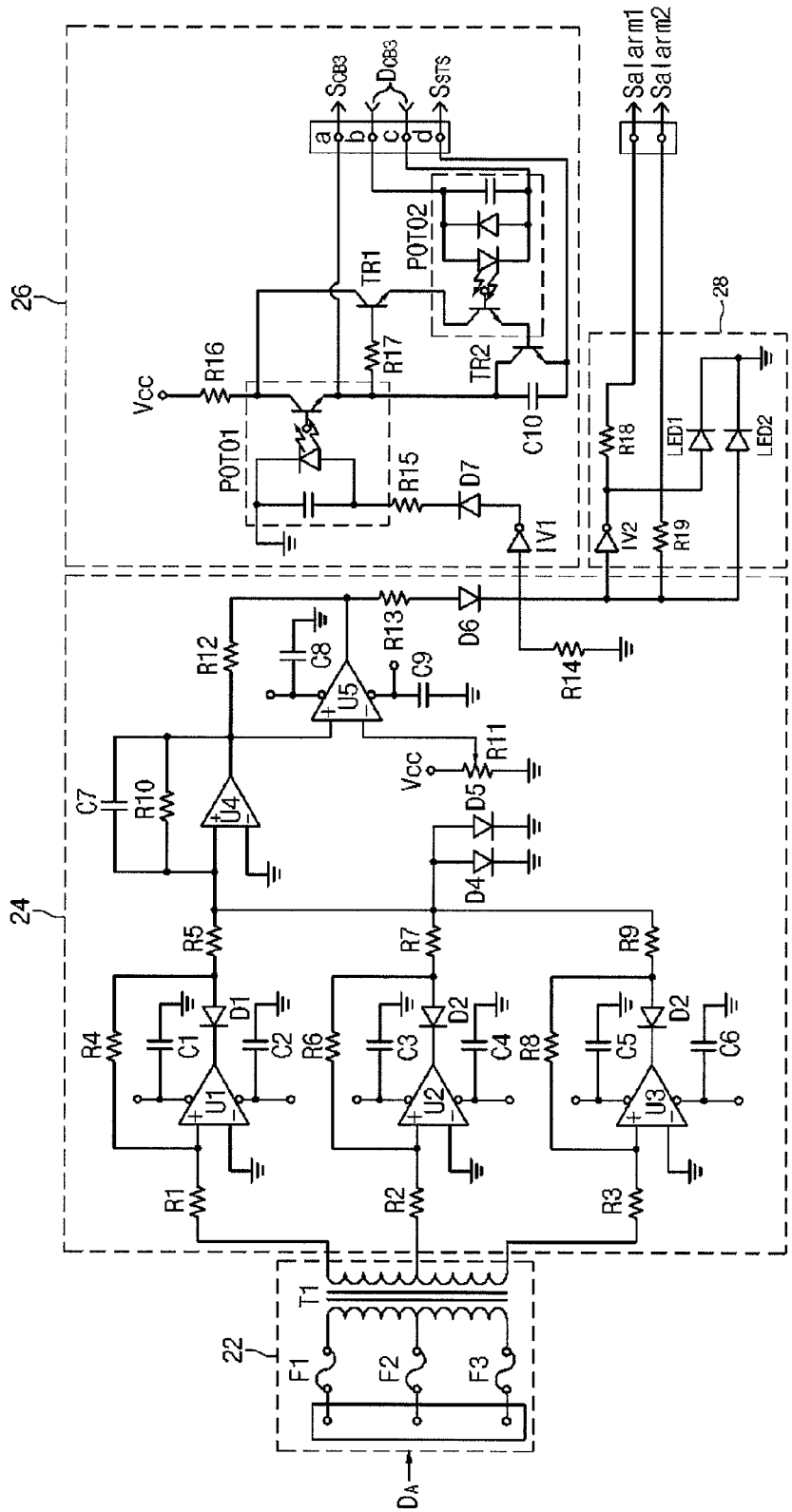
FIG. 5 is a circuit diagram showing the circuit configuration of the isolation control high speed transfer switch according to an embodiment of the present invention.

FIG. 4 is a configuration diagram showing the configuration of an isolation control high speed transfer switch 20 in FIG. 3, and FIG. 5 is a circuit diagram showing the circuit configuration of the isolation control high speed transfer switch 20 according to an embodiment of the present invention.

The isolation control high speed transfer switch 20 provides an output state detection unit 22, a power quality determining unit 24, a switching command unit 26 and an alarm generating unit 28.

The output state detection unit 22 detects and outputs the state DA of the three-phase output power of UPS 10 by using a conversion transformer T1. This output state detection unit 22 provides a fuse F1~F3 and the conversion transformer T1.

The power quality determining unit 24 determines whether the quality of the output power, that is, the output power deviated from the set normal range by comparing the output power of the output state detection unit 22 with the reference power. That is, the power quality determining unit 24 compares a digital signal with the reference power after converting the three-phase output power of the output state detection unit 22 into the respective digital signal, so that it can determine whether the output power of UPS 10 is deviated from the normal range or not. In case it is determined that there is a problem in the output power source of UPS 10, the power quality determining unit 24 activates the abnormality generation signal of low level and outputs it to the switching command unit 26 and the alarm generating unit 28. This power quality determining unit 24 provides a resistance R1~R14, a comparator U1~U5, a capacitor C1~C9 and a diode D1~D6.

The switching command unit 26 activates the switching signal $S_{CB3}$ for turning off the output breaker CB3 and the switching signal $S_{STS}$ for turning on the static transfer switch STS of the bypass line, in case the abnormality generation signal is activated in the power quality determining unit 24. At this time, the switching command unit 26 confirms the ON/OFF state $D_{CB3}$ of the output breaker CB3, and activates the switching signal $S_{STS}$ only when the output breaker CB3 is normally turned off. This switching command unit 26 provides an inverter IV1, a resistance R15~R17, an optical coupler POTO1, POTO2, a capacitor C10, a transistor TR1, TR2, and a diode D7.

According to the output signal of the power quality determining unit 22, the alarm generating unit 28 informs whether the abnormality of the power quality is occurred, and outputs an alarm signal $S_{alarm1}$, $S_{alarm2}$ corresponding to it. This alarm generating unit 28 includes an inverter IV2, a resistance R18, R19 and a light emitting diode LED1, LED2, and the light emitting diode LED1 is turned on and the light emitting diode LED2 is turned off in the abnormality occurrence of the power quality.

Figure 6:
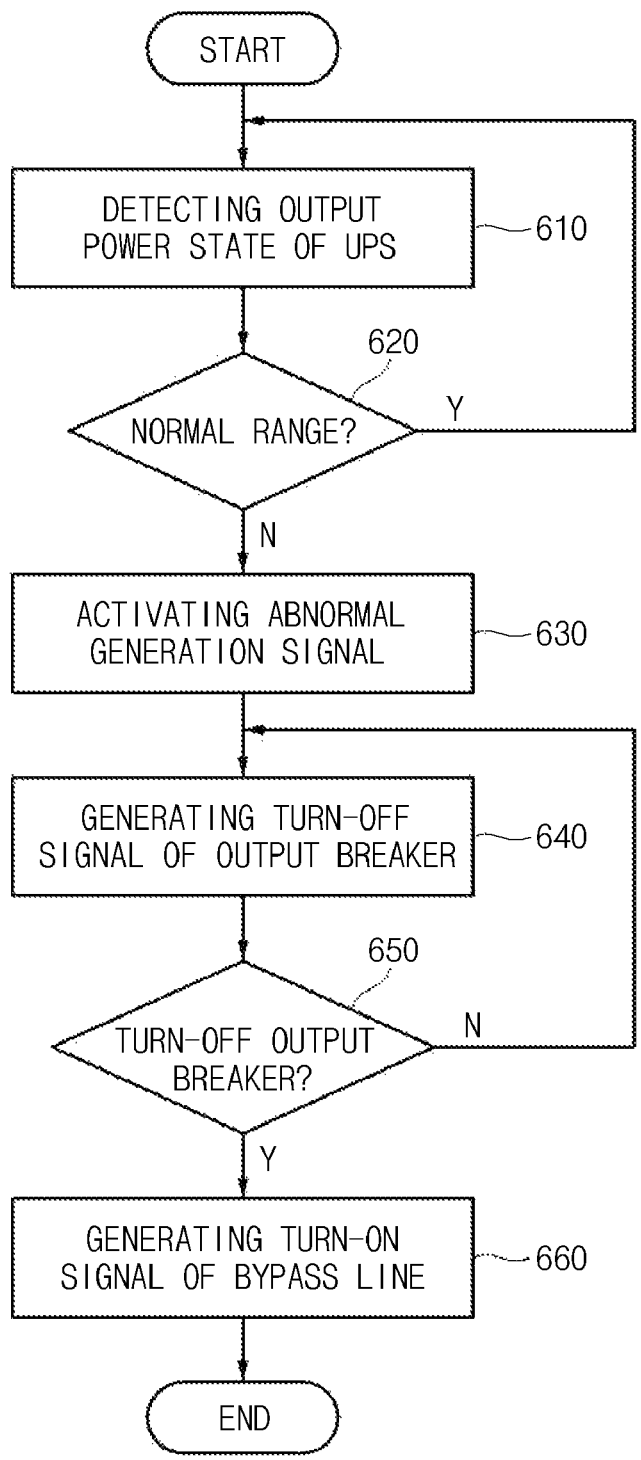
FIG. 6 is a flowchart illustrating the high speed transfer switch method according to one embodiment of the present invention.

FIG. 6 is a flowchart illustrating the high speed transfer switching method according to one embodiment of the present invention.

The high speed switch of one embodiment of the present invention is applicable to the case where the power supply path is switched from the normal power line to the bypass line, since the power cannot be normally supplied through the normal power line due to the abnormality of the inside of UPS 10 while the input power is normally received.

The output state detection unit 22 lowers the magnitude of the power which is inputted by using the conversion transformer T1 to a specific level for the signal processing when it is applied with the three-phase output power of UPS 10, and outputs it to the power quality determining unit 24 at step 610.

As to the output state detection unit 22, when the output power of UPS 10 exceeds the set normal range, the fuse F1~F3 is broken off. Therefore, the output state detection unit 22 outputs the power which has a lower voltage level than the preset reference power source when the output power of UPS 10 is deviated from the normal range. The power quality determining unit 24 converts the three-phase power outputted in the output state detection unit 22 into the digital signal by using the comparator U1~U3, and compares it with the reference power to determine whether the state of UPS 10 output power is within the preset normal range at step 620.

The magnitude of the reference power can be adjusted by controlling the magnitude of the variable resistance R11. At this time, the voltage level of the power outputted in the output state detection unit 22 is lowered than the reference voltage in case the output power of UPS 10 is deviated from the normal range. Accordingly, the comparator U5 transits the output signal to the low level and outputs it. That is, as to the power quality determining unit 24, in case the output power of UPS 10 is deviated from the normal range, the abnormality generation signal is activated with the low level and outputted to the switching command unit 26 and the alarm generating unit 28 at step 630.

The abnormality generation signal applied to the switching command unit 26 is applied to the optical coupler POTO1 after being inverted into a high level in the inverter IV1, and turns on the optical coupler POTO1. In case the optical coupler POTO1 is turned on, the power supply voltage Vcc is transmitted through the resistance R16 and the transistor of the optical coupler POTO1, thereby, the switching signal $S_{CB3}$ for turning off the output breaker CB3 is outputted through a signal induction point at step 640.

Thereafter, the switching command unit 26 confirms whether the output breaker CB3 is normally turned off by the switching signal $S_{CB3}$ at step 650, and activates the switching signal $S_{STS}$ for turning on the static transfer switch STS only when the output breaker CB3 is normally turned off, and outputs it through the signal induction point at step 660.

The confirming of turn-off of the output breaker CB3 and the switching signal SSTS activation process through the confirming are illustrated in detail. The switching command unit 26 confirms whether the output breaker CB3 is turned off by the signal which is applied through the signal induction point b, c. The connection relation of the signal induction point b, c, can be changed according to the type of the output breaker CB3.

Figure 7:
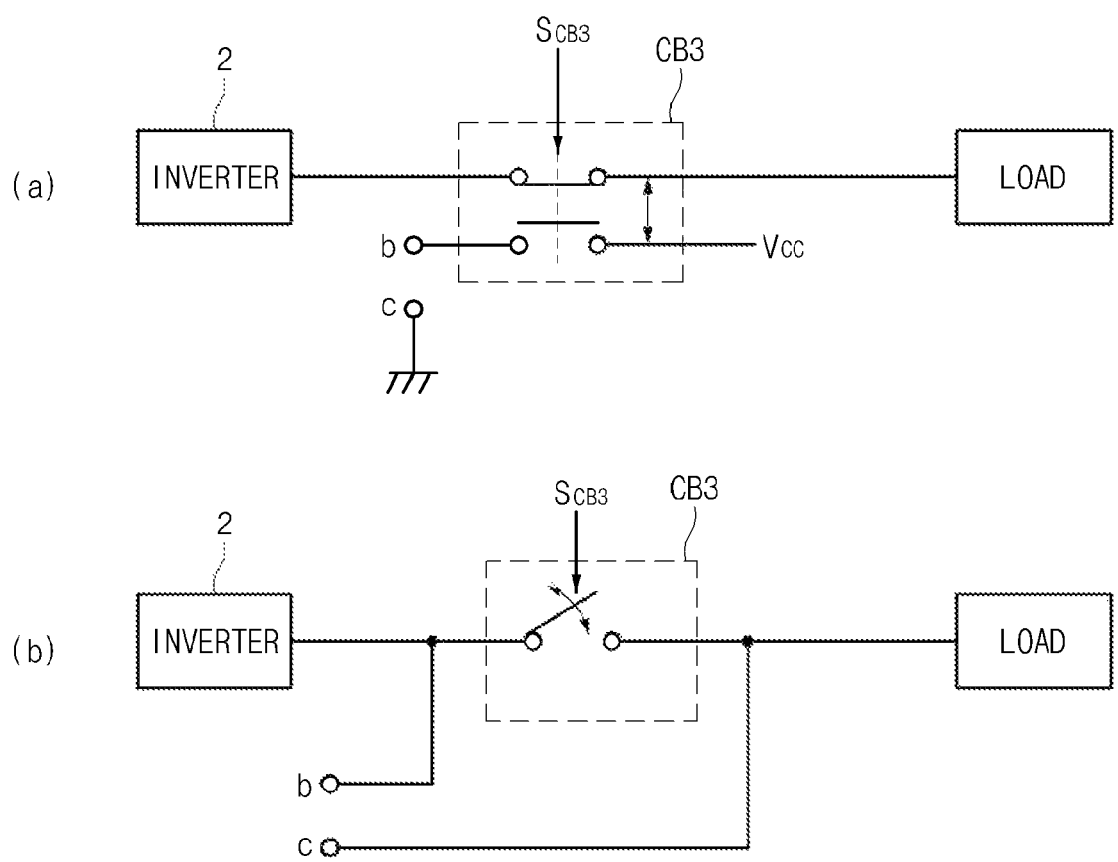
FIG. 7 is a drawing illustrating the method for confirming whether the output breaker is turned off according to the kind of an output breaker.

For instance, as shown in (a) of FIG. 7, in case two switches of the output breaker CB3 are mechanically connected and operate in order that one transfer switch of the output breaker CB3 is turned on while another transfer switch is turned off CASE 1, the signal induction point b is connected to the lower end transfer switch (another transfer switch which is not connected to the normal power line). Here, the signal induction point c is earthed.

On the other hand, in case the output breaker CB3 is configured with a single transfer switch as shown in (b) of FIG. 7 CASE 2, the signal induction point b, c is connected to both ends of the output breaker CB3 respectively.

In case of CASE 1, when the upper end transfer switch of CB3 is normally turned off by the switching signal $S_{CB3}$, the lower end transfer switch is turned on by the mechanical connection. As the lower end transfer switch is turned on, the power supply voltage is applied through the signal induction point b, so that the optical coupler POTO2 of the switching command unit 26 is turned on. When the optical coupler POTO2 is turned on, the power supply voltage Vcc is applied through the resistance R16, the transistor TR1 and the optical coupler POTO2, thereby, the transistor TR2 is turned on. When the transistor TR2 is turned on, the switching signal $S_{STS}$ is outputted since the power supply voltage Vcc is outputted through the resistance R16, the optical coupler POTO1 and the transistor TR2 to the signal induction point d, In case of CASE 2, when the output breaker CB3 is turned on, the voltage difference between the signal induction point b, c is not generated, so that the optical coupler POTO2 is not turned on, whereas when the output breaker CB3 is turned off, voltage difference between the signal induction point b, c is generated, so that the optical coupler POTO2 is turned on. As the operation after the optical coupler POTO2 is turned on is identical with the above mentioned CASE 1, the next operation will be omitted.

The abnormality generation signal applied to the alarm generating unit 28 at step 630 is inverted into the high level by the inverter IV2, and turns on the light emitting diode LED1 to inform a system operator that the abnormality has occurred. According to the activation of the abnormality generation signal, the alarm generating unit 28 activates the alarm signal $S_{alarm1}$, and $S_{alarm2}$ to the high level and the low level respectively to output.

At this time, the light emitting diodes LED1, LED2 are to inform the occurrence or nonoccurrence of the abnormality to the system operator who is located around the power supply system of one embodiment of the present invention. The alarm signals $S_{alarm1}$, $S_{alarm2}$ are used for the signal for notifying the remote guard whether the abnormality has occurred or not.

Figure 8:
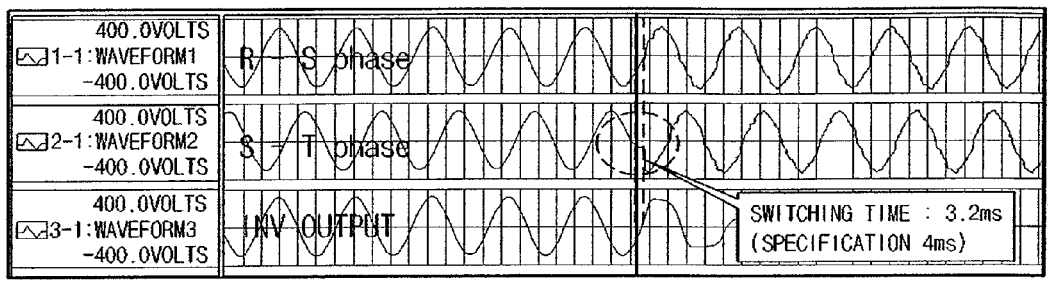
FIG. 8 shows graphs showing the change of the state of UPS output power in case a switching is performed by using the isolation control high speed transfer switching device according to one embodiment of the present invention.
Figure 8:
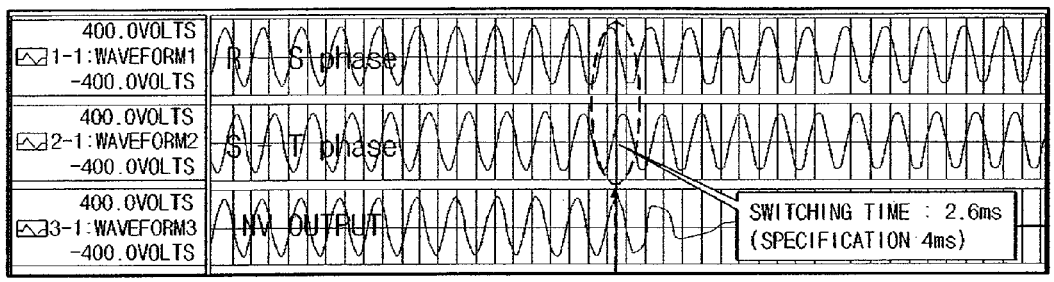
Figure 8:
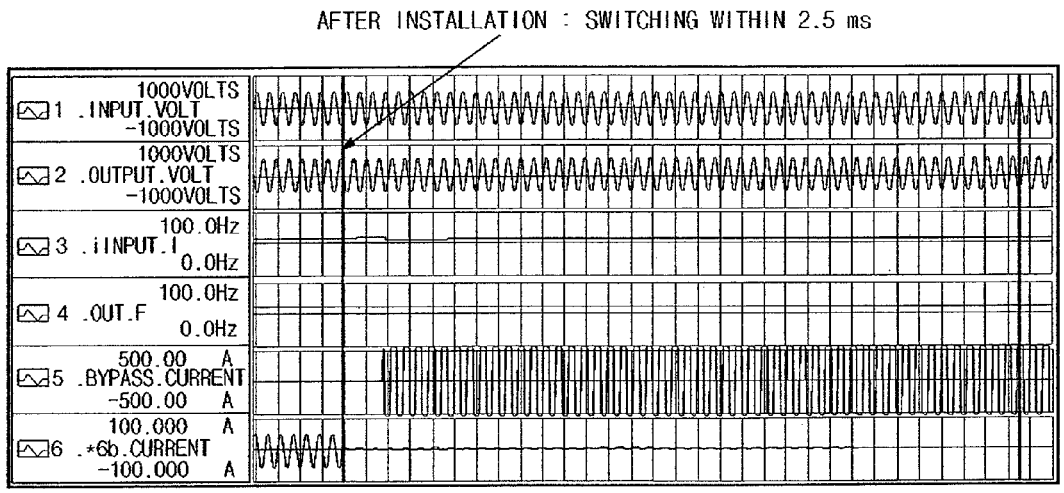

FIG. 8 shows graphs showing the change of the state of UPS output power in case a switching is performed by using the isolation control high speed transfer switching unit according to one embodiment of the present invention.

Referring to FIG. 8, in case of using one embodiment of the present invention, it can be known that the switching from the normal power line to the bypass line is performed within 4 ms which is the basic specification of UPS.

According to one embodiment of the present invention, the isolation control high speed transfer switch is capable of rapidly detecting the abnormality of UPS output power irrespective of the normality of UPS function and switching to a bypass line by independently operating with UPS. Furthermore, the isolation control high speed transfer switch of one embodiment of the present invention confirms whether an output breaker of a normal power line is normally turned off or not in switching the normal power line to the bypass line, and performs switching only when it is normally turned off for the stable switching,

What is claimed is:

1. A switching apparatus for switching an uninterruptible power supply (UPS) connected to the switch apparatus, the UPS comprising an output breaker, a bypass line and a transfer switch of the bypass line, the switching apparatus comprising:
 a first circuit configured to detect an output voltage of the UPS;
 a second circuit configured to compare the detected output voltage with a reference voltage, and configured to selectively generate an abnormality signal based on the comparison; and
 a switching command circuit configured:
  to generate a first switching signal for turning off the output breaker of the UPS in response to the abnormality signal,
  to detect turning-off of the output breaker in response to the first switching signal such that the bypass line is connected only when the output breaker is actually turned off, and
  upon detection to generate a second switching signal for turning on the transfer switch of the bypass line of the UPS.

2. The apparatus of claim 1, wherein the first circuit includes:
 a fuse configured to be broken off when the output voltage of the UPS exceeds the preset normal range; and
 a conversion transformer configured to lower the power applied through the fuse to a specific level, and further configured to output it to the second circuit.

3. The apparatus of claim 1, wherein the switching command circuit includes:
 a first optical coupler configured to be turned on when the abnormality signal is generated, and further configured to generate the first switching signal;
 a second optical coupler configured to be turned on when the output breaker is turned off, and further configured to detect the turn-off of the output breaker; and
 a transfer switch circuit configured to be turned on when the second optical coupler is turned on, and further configured to output the output signal of the first optical coupler as the second switching signal.

4. The apparatus of claim 3, wherein the second optical coupler is configured to receive the voltage of both ends of the output breaker, and further configured to be turned on when a voltage difference is generated in both ends of the output breaker.

5. The apparatus of claim 1, further comprising an alarm generating circuit configured to generate an alarm signal when the abnormality signal is generated, and further configured to output the alarm signal.

6. A power supply system comprising:
an uninterruptible power supply (UPS) configured to supply an input power or a battery power of the inside to a load through a normal power line in a normal mode, and further configured to switch a power supply path from the normal power line to a bypass line upon receipt of at least one switching signal applied from the outside in an abnormal mode; and
the switching apparatus of claim 1, wherein the at least one switching signal comprises the second switching signal.

7. The power supply system of claim 6, wherein the output state detection unit includes:
a fuse configured to be broken off when the output voltage of the UPS exceeds the preset normal range; and
a conversion transformer configured to lower the power applied through the fuse to a specific level, and further configured to output it to the second circuit.

8. The power supply system of claim 6, wherein the switching command circuit includes:
a first optical coupler configured to be turned on when the abnormality signal is generated, and further configured to generate the first switching signal;
a second optical coupler configured to be turned on when the output breaker is turned off, and further configured to detect the turn-off of the output breaker; and
a transfer switch circuit configured to be turned on when the second optical coupler is turned on, and further configured to output the output signal of the first optical coupler to the second switching signal.

9. The power supply system of claim 8, wherein the second optical coupler is configured to receive the voltage of both ends of the output breaker, and further configured to be turned on when a voltage difference is generated in both ends of the output breaker.

10. The power supply system of claim 6, further comprising an alarm generating circuit configured to generate an alarm signal when the abnormality signal is generated, and further configured to output the alarm signal.

11. A method of switching an uninterruptible power supply (UPS) comprising an output breaker, a bypass line and a transfer switch of the bypass line, the method comprising:
generating an abnormality signal when the output voltage of the UPS is deviated from a preset normal range;
generating a first switching signal for turning off the output breaker of the UPS when the abnormality signal is generated;
detecting turning-off of the output breaker in response to the first switching signal such that the bypass line is connected only when the output breaker is actually turned off; and
subsequently to detecting, generating a second switching signal for turning on a transfer switch of a bypass line of the UPS.

12. The method of claim 11, wherein detecting comprises determining that the output breaker is turned off when a voltage difference between both ends of the output breaker is generated.

13. The method of claim 11, further comprising generating an alarm signal when the abnormality signal is generated.

* * * * *